United States Patent
Shen-Orr et al.

(10) Patent No.: US 9,135,453 B2
(45) Date of Patent: Sep. 15, 2015

(54) PREVENTING DATA EXTRACTION BY SIDE-CHANNEL ATTACK

(75) Inventors: Chaim Shen-Orr, Haifa (IL); Yonatan Shlomovich, Givat Ada (IL); Reuven Elbaum, Haifa (IL); Zvi Shkedy, Karmiel (IL); Lior Amarilio, Yokneam (IL); Yigal Shapiro, Zichron Yaakov (IL); Uri Bear, Pardes-Hana (IL)

(73) Assignee: CISCO TECHNOLOGY INC., San Jose, CA (US)

( * ) Notice: Subject to any disclaimer, the term of this patent is extended or adjusted under 35 U.S.C. 154(b) by 101 days.

(21) Appl. No.: 14/131,396

(22) PCT Filed: Aug. 27, 2012

(86) PCT No.: PCT/IB2012/054365
§ 371 (c)(1),
(2), (4) Date: Jan. 7, 2014

(87) PCT Pub. No.: WO2013/035006
PCT Pub. Date: Mar. 14, 2013

(65) Prior Publication Data
US 2014/0143883 A1      May 22, 2014

Related U.S. Application Data

(60) Provisional application No. 61/573,453, filed on Sep. 6, 2011.

(30) Foreign Application Priority Data

Jan. 30, 2012   (GB) .................................. 1201484.1

(51) Int. Cl.
G06F 17/30    (2006.01)
G06F 21/60    (2013.01)
(Continued)

(52) U.S. Cl.
CPC .............. *G06F 21/60* (2013.01); *G06F 21/558* (2013.01); *H04L 9/003* (2013.01)

(58) Field of Classification Search
CPC ............. H04L 9/22; H04L 9/26; H04L 9/003; G06F 21/72; G06F 21/78; G06F 21/86; G06F 21/14; G06F 21/50; G06F 21/60; G06F 7/60; G06F 7/588; G06F 21/558
USPC ........... 380/46; 713/189, 193; 726/26–27, 30; 708/250, 255
See application file for complete search history.

(56) References Cited

U.S. PATENT DOCUMENTS 6,278,783 B1   8/2001   Kocher et al.
7,000,111 B1   2/2006   Dent et al.
(Continued)

FOREIGN PATENT DOCUMENTS

EP         1 898 311 A1      3/2008
WO    WO 2004/081971 A2     9/2004
WO    WO 2009/158881 A2    12/2009

OTHER PUBLICATIONS

Jan. 23, 2013 Transmittal of International Search Report and Written Opinion of the International Searching Authority for captioned application.

(Continued)

*Primary Examiner* — Hosuk Song
(74) *Attorney, Agent, or Firm* — Hahn Loeser & Parks LLP

(57) ABSTRACT

A method for data transfer includes receiving a control signal triggering a transfer of a secret value into an element (24) of a circuit (20). In response to the control signal, a dummy value (42, 50) and the secret value are inserted in succession into the element of the circuit.

10 Claims, 2 Drawing Sheets

(51) Int. Cl.
*G06F 21/55* (2013.01)
*H04L 9/00* (2006.01)

(56) References Cited

U.S. PATENT DOCUMENTS

| | | | |
|---|---|---|---|
| 7,185,362 B2* | 2/2007 | Hawkes et al. | 726/4 |
| 7,420,862 B2 | 9/2008 | Hummler | |
| 7,496,616 B2* | 2/2009 | Chari et al. | 708/250 |
| 8,457,302 B1* | 6/2013 | Vater et al. | 380/1 |
| 2001/0014944 A1 | 8/2001 | Ibi et al. | |
| 2001/0053220 A1 | 12/2001 | Kocher et al. | |
| 2004/0059908 A1 | 3/2004 | Yamada et al. | |
| 2005/0002523 A1 | 1/2005 | Sonnekalb | |
| 2007/0180541 A1 | 8/2007 | Shu et al. | |
| 2009/0262930 A1 | 10/2009 | Lambert | |
| 2010/0318811 A1 | 12/2010 | Motoyama | |
| 2011/0013769 A1 | 1/2011 | Itoh et al. | |
| 2011/0064225 A1 | 3/2011 | Gebotys | |

OTHER PUBLICATIONS

May 22, 2012 Office Communication in connection with prosecution GB1201484.1.

Aug. 6, 2013 Office Communication in connection with prosecution GB1201484.1.

\* cited by examiner

US 9,135,453 B2

PREVENTING DATA EXTRACTION BY SIDE-CHANNEL ATTACK

CROSS-REFERENCE TO RELATED APPLICATIONS

This application is a §371 submission of international application PCT/IB2012/054365, filed 27 Aug. 2012 and published in the English language on 14 Mar. 2013 with publication no. WO 2013/035006 A1, which claims the benefit of the filing dates of U.S. Provisional Patent Application 61/573,453, filed Sep. 6, 2011, and GB 1201484.1, filed 30 Jan. 2012, which are incorporated herein by reference.

FIELD OF THE INVENTION

The present invention relates generally to data security, and particularly to protection of electronic devices and data stored in such devices against unauthorized access.

BACKGROUND

A variety of tools and methods are available for extracting information from electronic devices by sensing their internal signals. These tools and methods may be used by attackers to gain unauthorized access to secret information within such devices. In response, device manufacturers have developed techniques for impeding such attacks.

For example, U.S. Patent Application Publication 2005/0002523 describes an apparatus said to provide security against differential power analysis (DPA) attacks. The apparatus has a multiplexer with a control input, data inputs, and a data output for the encrypted mapped output value for through-connecting an encrypted data signal at one of the data inputs to the data output. The encrypted data signals for the data inputs of the multiplexer are provided based on an encryption key. A control signal indicating the output value to be mapped is applied to the control input of the multiplexer.

U.S. Pat. No. 7,420,862 describes a data inversion device, which includes a differential amplifier having first and second input lines. A controller is coupled to selectively and individually decouple the first and second input lines from the differential amplifier.

PCT International Publication WO 2009/156881 describes a method for hindering detection of information unintentionally leaked from a secret held in a memory unit. The memory unit is in a non-operational state during at least a first amount of time, after which a condition under which the memory unit operates changes, thereby causing the memory unit to enter an operational state. After waiting for a second amount of time, at least a second condition under which the memory unit operates is changed, thereby causing the memory unit to enter the non-operational state. Access to the secret information is enabled only during the second amount of time, and detection of secret information unintentionally leaked is limited during the first amount of time.

U.S. Patent Application Publication 2009/0262930 describes a method of inhibiting the disclosure of confidential information through power analysis attacks on processors in cryptographic systems. The method masks a cryptographic operation using a generator G. A secret value, which may be combined with the generator G to form a secret generator is generated. The secret value is divided into a plurality of parts. A random value is generated for association with the plurality of parts. The introduction of randomness is said to facilitate the introduction of noise into algorithms used by cryptographic systems so as to mask the secret value and provide protection against power analysis attacks.

U.S. Patent Application Publication 2001/0053220 describes cryptographic computation using masking to prevent differential power analysis and other attacks. During operation of the device described in the publication, tables used in the computation are preferably periodically updated, by introducing fresh entropy into the tables faster than information leaks out, so that attackers will not be able to obtain the table contents by analysis of measurements.

U.S. Patent Application Publication 2007/0180541 describes a cryptographic architecture with instruction masking and other techniques for thwarting differential power analysis. A random number of instructions is inserted into an encryption algorithm so that leaked information cannot be aligned in time to allow an attacker to break the encryption.

SUMMARY

Embodiments of the present invention that are described hereinbelow provide techniques that can be implemented in electronic circuits to protect secret data from unauthorized discovery.

There is therefore provided, in accordance with an embodiment of the present invention, a method for data transfer, which includes receiving a control signal triggering a transfer of a secret value into an element of a circuit. In response to the control signal, a dummy value, which may be a deterministic, non-constant dummy value, and the secret value are inserted in succession into the element of the circuit.

Inserting the dummy value and the secret value in succession may include inserting the dummy value into the element and then overwriting the dummy value with the secret value, and/or inserting the secret value into the element and then overwriting the secret value with the dummy value.

In a disclosed embodiment, the method includes asserting a data valid signal after inserting the secret value into the element, wherein the data valid signal is deasserted while the element holds the dummy value.

The dummy value may include a non-constant value, such as a random value or a string of alternating bits. Alternatively, the dummy value may include an inverse of the secret value.

There is also provided, in accordance with an embodiment of the present invention, an electronic device, including a secret data source, configured to provide a secret value, and a dummy data generator, configured to generate dummy values. A circuit element, is configured to receive data values. A switching element is configured, in response to a control signal triggering a transfer of the secret value into the circuit element, to successively insert a dummy value from the dummy data generator and the secret value from the secret data source into the circuit element. The present invention will be more fully understood from the following detailed description of the embodiments thereof, taken together with the drawings in which:

DETAILED DESCRIPTION OF EMBODIMENTS

Figure 1:
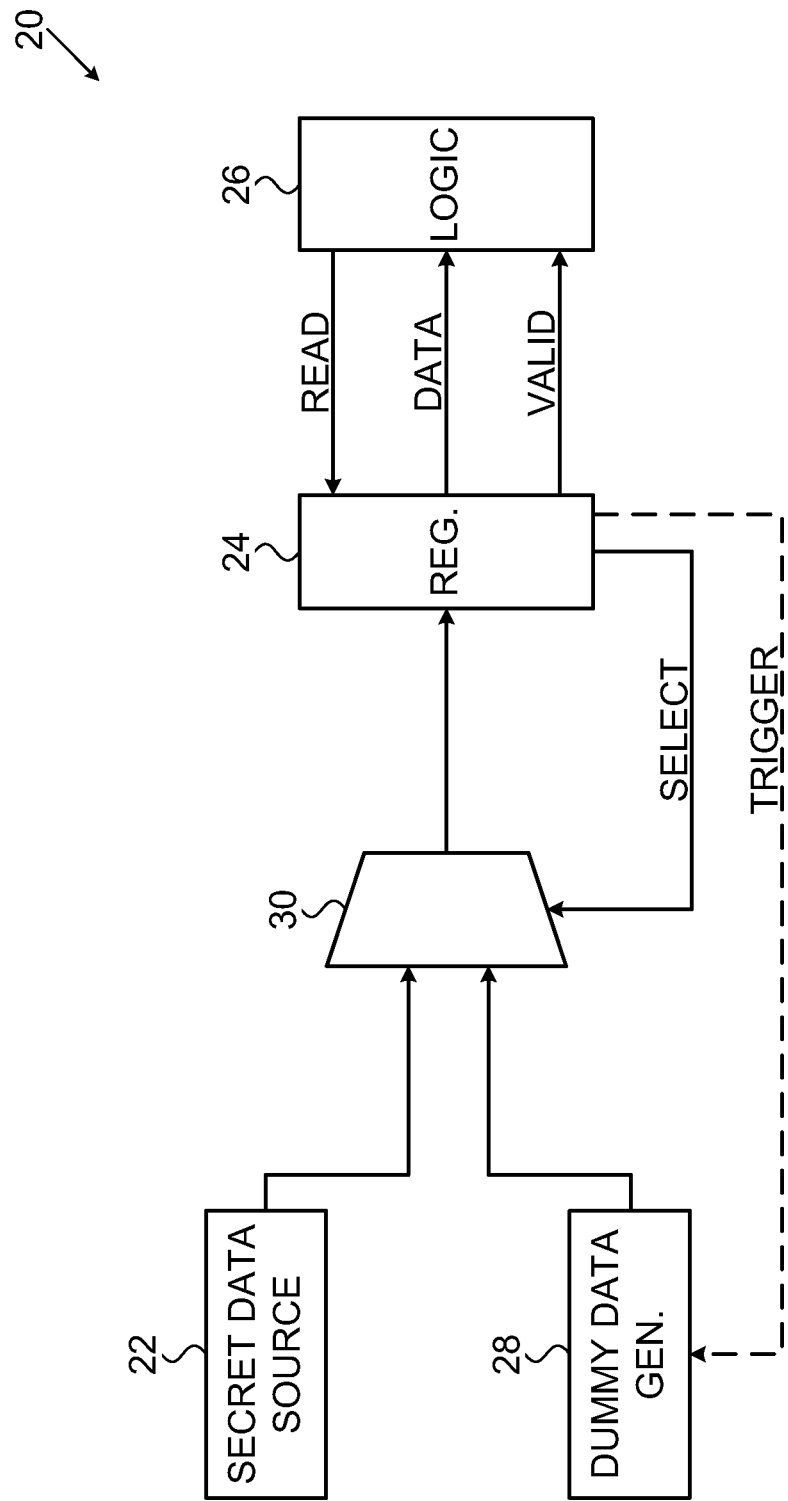
FIG. 1 is a block diagram that schematically illustrates a circuit that uses dummy data to protect against side-channel attacks, in accordance with an embodiment of the present invention.

Various techniques have been developed for extracting information from circuit elements, such as registers, gates, buffers and switches, within integrated circuit devices. These techniques are sometimes used by unauthorized parties to gain access to secret information that is stored or generated within the device.

Some of these techniques involve "side channels," meaning that the secret information is extracted without actually making electrical contact with the conductors in the circuit that carry this information. Side-channel techniques include, for example, non-invasively measuring electrical signals by power analysis and measuring radiation emitted from circuit elements inside an integrated circuit. These techniques take advantage of the fact that many circuit elements, such as CMOS elements, consume power (and may therefore also emit radiation) mainly during transitions of logic elements, i.e., changing their values from 0 to 1 or from 1 to 0. This power consumption is the source of the side-channel signals.

Based on this principle, an attacker may measure power consumption or emitted radiation while causing a circuit element to cycle between a known state (such as all bits=0, or a default value determined by reverse engineering) and an unknown state in which the element holds a secret value. Such attacks may be carried out by taking control of the software, repeated resets, or application of power "glitches," for example. As a result of such operations, side-channel signals are generally emitted from all the bits that make a transition, because their secret values are different from the corresponding bits in the known value, while no (or extremely weak) signals are emitted from all the bits whose values do not change. Sensing these signals thus enables the attacker to infer the secret value by comparison with the known value.

The side-channel signals that are acquired by such techniques typically have signal amplitudes so low that they cannot be read reliably from a single measurement. Therefore, it is generally necessary for the attacker to repeat the measurements many times and integrate the measurement results in order to collect a signal that is strong enough to be useful.

In embodiments of the present invention that are described hereinbelow, such side-channel attacks are foiled by means of dummy values, which are generated dynamically within a circuit that may be subject to attack and are not available to the attacker. The circuit is configured so that upon receiving a control signal triggering a transfer of a secret value into a certain element of the circuit, a dummy value and the secret value are inserted in succession into the element. The dummy value is inserted automatically, typically by hard-wired logic, so that the attacker cannot readily reach or tamper with it. The dummy value may be inserted either before or after the secret value, typically in rapid succession (i.e., within one or a few clock cycles).

As a result of the insertion of the dummy value in succession with the secret value, each cycle of inserting the secret value into the circuit element will involve two sets of bit transitions, including transitions between the dummy value and the secret value, or vice versa. (Transitions between the dummy value and the secret value or between the secret value and the dummy value are referred to herein collectively as "masking transitions.") Because the dummy value is not known to the attacker, the power consumed in the masking transitions cannot provide the attacker with any useful information. When the attacker attempts to measure and integrate side-channel signals over multiple cycles, the mixture of masking transitions over the cycles will obscure any useful information that the attacker might otherwise be able to extract, thus foiling the side-channel attack.

The dummy values that are used in embodiments of the present invention may be random, or they may be non-constant, deterministic values, as long as they are selected in a way that cannot readily be discovered or predicted by an attacker. These values are referred to as "dummy" because they need not actually be used in operations of the circuit. For example, the dummy value may be present in the circuit element only while the "data valid" signal of the element is deasserted (meaning that the data in the element is considered invalid by other elements of the circuit), and thus is not propagated to other circuit elements. On the other hand, in some embodiments, the dummy value may be reused, for example as a random value in a subsequent cryptographic operation.

The techniques described herein may be used to mask transitions due to insertion of secret values into substantially any sort of circuit element, including, for example, memory elements such as registers and buffers and logical elements such as switches and gates. Different terms are commonly used in the art to denote data transfer operations into such circuit elements, including "loading," "propagating," "switching," "reading in," and so forth. The term "insert," as used in the context of the present description and in the claims, should therefore be understood as encompassing all relevant types of data transfer, differences of jargon notwithstanding.

FIG. 1 is a block diagram that schematically illustrates a circuit 20 that uses dummy data to protect against side-channel attacks, in accordance with an embodiment of the present invention. Circuit 20 is much simplified, for the sake of clarity of explanation. In practice, embodiments of the present invention are typically incorporated in more complex circuits in which data security is a concern, such as in smart cards, disk-on-key devices, media players, and communication devices, inter alia. Furthermore, although FIG. 1 shows, by way of illustration, only a single dummy data generator 28 feeding a single register 24 (as explained below), similar arrangements may be used for insertion of dummy values into other types of circuit elements; and the same dummy data generator may provide dummy data to multiple different elements, of various different types, in the circuit. Alternatively or additionally, the circuit may comprise multiple dummy data generators feeding multiple different circuit elements.

In the pictured embodiment, a secret data source 22 provides secret data on demand to a register 24, which is then read out by logic 26. The secret data source may comprise, for example, a one-time programmable (OTP) memory holding a unique secret key, or any other suitable type of secure memory. Alternatively, the secret data source may comprise any other circuit element that receives or computes a secret value for loading into register 24. When register 24 receives a control signal indicating that a secret value is to be read into the register, a suitable switching element, such as a multiplexer 30, is activated by a "select" signal to read in the secret value from source 22 and a dummy value from dummy data generator 28 in succession. The control signal to register 24 may comprise assertion of a read request line from logic 26, for example, or a signal asserted by a controller or other processor (not shown). Multiplexer 30 may first select the dummy value and then the secret value, or vice versa, or it may read dummy values into register 24 both before and after the secret value. Alternatively, other sorts of switching elements may be used to successively load the dummy and secret values.

As noted above, the dummy and secret values are typically read into register 24 in rapid succession. The operation of the circuit elements involved is typically hard-wired in the circuit logic or hard-coded in the controller, so that even if the attacker is able to externally cause circuit 20 to load the secret value repeatedly, each repetition will be accompanied by loading of the dummy value, as well. In this manner, the attacker will be prevented from extracting useful side-channel information regarding the secret value. In some embodiments, dummy data generator 28 may be triggered to generate a new dummy value before each such load operation, as illustrated in FIG. 1.

When register 24 has loaded the secret value and sufficient time has elapsed for the data to settle in the register, a "valid" signal to logic 26 is asserted, indicating that data are available for readout from the register. To reduce latency in delivery of the secret value, the dummy value may be delivered to and held by the register only while the register is in the invalid state, i.e., while the valid signal is deasserted. For example, multiplexer 30 may read the dummy value into register 24 for a short period immediately prior to reading in the secret value, which then overwrites the dummy value before the register becomes valid. (As long as the dummy value is not used by subsequent circuit elements, it need never actually be stable in register 24.) Alternatively or additionally, the multiplexer may read the dummy value into the register (and overwrite the secret value) after the secret value has been read out to logic 26. The attacker measuring side-channel signals emitted from circuit 20 will generally be unable to sense whether or not the valid signal is asserted and thus will be unable to distinguish between loading of the secret and dummy values. Optionally, multiple different dummy values may be read successively into register 24 each time a secret value is read in.

Dummy data generator 28 may implement any suitable sort of data generation function, so long as the function is such that the probability of a bit transition between the secret and dummy values for any given bit is high and is independent of the secret value of the given bit. A "high" probability means that over the number of repetitions of the load operation that are needed by an attacker in order to gather a significant side-channel signal, all bits will undergo roughly the same number of transitions on average. Thus, in a typical scenario in which a side-channel measurement requires 1000 repetitions, a 10% probability is high enough. To foil extremely sensitive side-channel measurements, the transition probability may be increased to 30% or even to 50% (or more). It generally does not matter whether a given bit transition is upward (from 0 to 1) or downward (from 1 to 0), since the number of upward and downward transitions of any given bit will tend to average out over multiple transitions from dummy to secret value and back again. A number of example implementations of dummy data generators are presented below.

In an alternative embodiment, the dummy values provided by dummy data generator 28 may be used in subsequent operations of circuit 20. For example if the dummy values are random, logic 26 may read them in alternation with the secret values from secret data source 22 and may use the random values in cryptographic operations, as are known in the art. The bit transitions between the secret and dummy values are no less effective in this case in masking side-channel information.

Even when the dummy values are read into register only while the register is an invalid state, alternation of the dummy and secret values may still introduce some additional latency into circuit 20. To avoid this latency in applications in which speed is critical, register 24 may be duplicated, and the secret and dummy values may be toggled between the pair of registers, so that at each clock cycle one of the registers will hold a valid secret value. Logic 26 toggles its input between the registers to read the valid secret value at each cycle.

Figure 2:
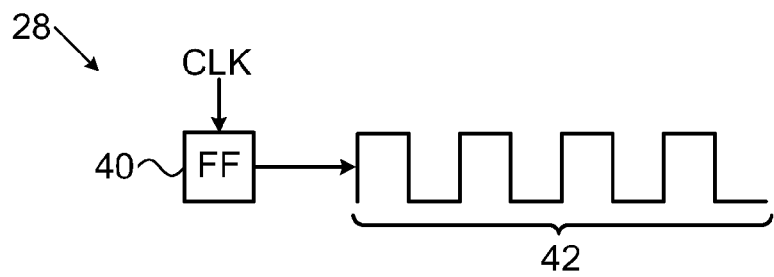
FIGS. 2-4 are block diagrams that schematically illustrate dummy data generators, in accordance with embodiments of the present invention.

FIG. 2 is a block diagram that schematically shows one possible implementation of dummy data generator 28, in accordance with an embodiment of the present invention. A toggling circuit, such as a flip-flop 40, generates an output that changes from 0 to 1 and vice versa each time it is triggered by a clock input (which may be provided by the falling edge of the "data valid" signal of register 24, for example). In this case, a dummy value 42 output by generator 28 will comprise a string of alternating bits, with 0 and 1 successively inserted into all bits of the dummy value. As a result, the probably of any given bit undergoing a transition in register 24 (and thus producing a side-channel signal) each time a secret value is loaded will be very close to 50%, regardless of the secret value, so that no meaningful data can be extracted by integrated side-channel analysis.

Figure 3:
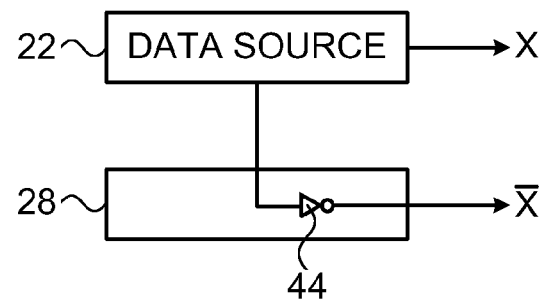

FIG. 3 is a block diagram that schematically shows another possible implementation of dummy data generator 28, in accordance with an embodiment of the present invention. Generator 28 comprises a bit inverter 44, so that each bit of the dummy value is the logical complement of the corresponding bit in the secret value. As a result, for each secret value input to register 24, the probability of any given bit undergoing a transition that produces a side-channel signal will be close to 100%, regardless of the secret value, so that again no meaningful data can be extracted.

Figure 4:
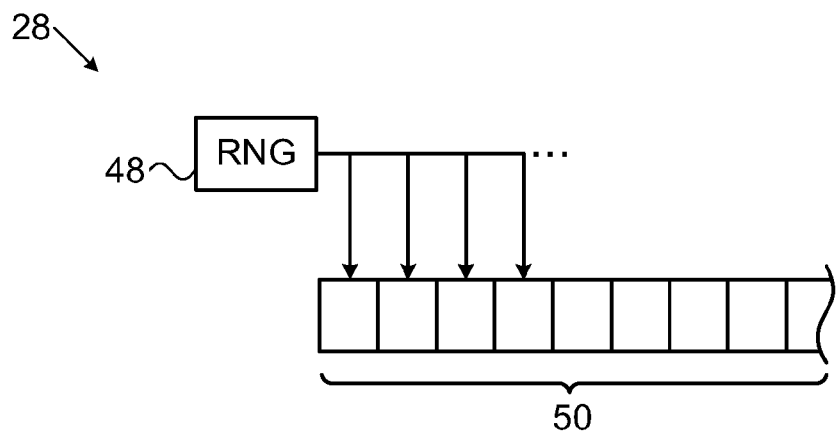

FIG. 4 is a block diagram that schematically shows yet another possible implementation of dummy data generator 28, in accordance with an embodiment of the present invention. In this case, a random number generator (RNG) 48 provides bit values to generate a dummy value 50. The term "random" should be understood broadly to include both true random and pseudo-random bit generators. Each of the bits of dummy value 50 may have its own, individual random value; or alternatively, groups of the bits, or all the bits, may share the same bit value provided by RNG 48, as long as these bit values are updated (at random) each time a new dummy value is to be output. In either case, the probability of any given bit undergoing a transition that produces a side-channel signal will again be close to 50%, regardless of the secret value.

The techniques described above for foiling side-channel attacks using dummy data may optionally be used in conjunction with other defensive techniques. For example, the techniques described herein may be combined with value shifting methods, such as are described in U.S. Patent Application Publication 2011/0083194, as well as methods for foiling synchronized side-channel attacks, such as are described in PCT Patent Application PCT/IB2011/055117, filed Nov. 16, 2011, and other methods described in the references cited above in the Background section.

It will thus be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method for data transfer, comprising:
receiving a control signal triggering a transfer of a secret value into an element of a circuit; in response to the control signal, inserting a deterministic non-constant dummy value and the secret value in succession into the element of the circuit; and
asserting a data valid signal after inserting the secret value into the element, wherein the data valid signal is deasserted while the element holds the dummy value.

2. The method according to claim 1, wherein inserting the dummy value and the secret value in succession comprises inserting the dummy value into the element and then overwriting the dummy value with the secret value.

3. The method according to claim 1, wherein inserting the dummy value and the secret value in succession comprises inserting the secret value into the element and then overwriting the secret value with the dummy value.

4. The method according to claim 1, wherein the dummy value comprises a string of alternating bits.

5. The method according to claim 1, wherein the dummy value comprises an inverse of the secret value.

6. An electronic device, comprising:
   a secret data source, configured to provide a secret value;
   a dummy data generator, configured to generate deterministic, non-constant dummy values;
   a circuit element, which is configured to receive data values;
   a switching element, which is configured, in response to a control signal triggering a transfer of the secret value into the circuit element, to successively insert a deterministic non-constant dummy value from the dummy data generator and the secret value from the secret data source into the circuit element; and
   wherein the circuit element is configured to assert a data valid signal after inserting the secret value into the element, and wherein the data valid signal is deasserted while the circuit element holds the dummy value.

7. The device according to claim 6, wherein the switching element is configured to insert the dummy value into the element and then to overwrite the dummy value with the secret value.

8. The device according to claim 6, wherein the switching element is configured to insert the secret value into the element and then to overwrite the secret value with the dummy value.

9. The device according to claim 6, wherein the dummy value comprises a string of alternating bits.

10. The device according to claim 6, wherein the dummy value comprises an inverse of the secret value.

* * * * *